US008696204B2

(12) United States Patent
Ooga

(10) Patent No.: US 8,696,204 B2
(45) Date of Patent: Apr. 15, 2014

(54) SIDE SEAL FOR LINEAR GUIDE APPARATUS, AND LINEAR GUIDE APPARATUS

(75) Inventor: Kazuaki Ooga, Maebashi (JP)

(73) Assignee: NSK Ltd., Shinigawa-ku, Tokyo (JP)

( * ) Notice: Subject to any disclaimer, the term of this patent is extended or adjusted under 35 U.S.C. 154(b) by 0 days.

(21) Appl. No.: 13/880,127

(22) PCT Filed: Sep. 14, 2011

(86) PCT No.: PCT/JP2011/005197
§ 371 (c)(1),
(2), (4) Date: Apr. 18, 2013

(87) PCT Pub. No.: WO2012/056627
PCT Pub. Date: May 3, 2012

(65) Prior Publication Data
US 2013/0216160 A1    Aug. 22, 2013

(30) Foreign Application Priority Data
Oct. 26, 2010  (JP) ................................. 2010-239898

(51) Int. Cl.
*F16C 33/76*    (2006.01)
*F16C 29/04*    (2006.01)

(52) U.S. Cl.
USPC ............................... 384/15; 384/43; 277/345

(58) Field of Classification Search
USPC ........................... 384/13, 15, 43, 45, 477, 484
See application file for complete search history.

(56) References Cited

U.S. PATENT DOCUMENTS

| | | | |
|---|---|---|---|
| 4,886,376 A * | 12/1989 | Osawa | 384/45 |
| 4,963,038 A * | 10/1990 | Asano et al. | 384/15 |
| 5,306,089 A * | 4/1994 | Anada et al. | 384/45 |
| 5,399,023 A * | 3/1995 | Winkelmann et al. | 384/13 |
| 5,494,354 A * | 2/1996 | Tsukada | 384/13 |
| 5,496,113 A * | 3/1996 | Winkelmann et al. | 384/15 |
| 5,634,722 A * | 6/1997 | Yuasa et al. | 384/15 |
| 5,775,813 A * | 7/1998 | Saitoh | 384/45 |
| 6,435,718 B1 * | 8/2002 | Weiss et al. | 384/13 |
| 6,705,430 B2 * | 3/2004 | Michioka et al. | 184/5 |
| 7,736,059 B2 * | 6/2010 | Chen et al. | 384/45 |
| 7,789,564 B2 * | 9/2010 | Keller et al. | 384/43 |
| 2002/0154838 A1 * | 10/2002 | Yabe et al. | 384/477 |
| 2009/0245701 A1 * | 10/2009 | Ogura et al. | 384/15 |

FOREIGN PATENT DOCUMENTS

| | | | | |
|---|---|---|---|---|
| JP | 2000018244 A | * | 1/2000 | F16C 29/06 |
| JP | 2000304137 A | * | 11/2000 | F16C 29/08 |
| JP | 2003314548 A | * | 11/2003 | F16C 33/78 |
| JP | 2007-211900 A | | 8/2007 | |
| JP | 2008151325 A | * | 7/2008 | F16C 29/06 |
| JP | 2010084811 A | * | 4/2010 | F16C 33/76 |
| JP | 2010-156381 A | | 7/2010 | |

OTHER PUBLICATIONS

International Search Report dated Dec. 6, 2011 with English translation (two (2) pages).
Japanese-language Written Opinion (PCT/ISA/237) dated Dec. 6, 2011 (four (4) pages).
International Preliminary Report on Patentability (PCT/IB/373) dated May 14, 2013 and English translation of Document C2 (Japanese-language Written Opinion (PCT/ISA/237)) previously filed on Apr. 18, 2013.

* cited by examiner

*Primary Examiner* — Marcus Charles
(74) *Attorney, Agent, or Firm* — Crowell & Moring LLP

(57) ABSTRACT

Two kinds of side seals are assembled by a seal member, a holder plate, and a cover. A base of the seal member is formed in a symmetrical shape with respect to a center line of a thickness direction. The seal member includes recesses formed in both faces of the base in the thickness direction and fitted with a protrusion of the holder plate. A lip of the seal member is inclined in a direction from a first face toward a second face in the thickness direction.

9 Claims, 6 Drawing Sheets

FIG. 7A
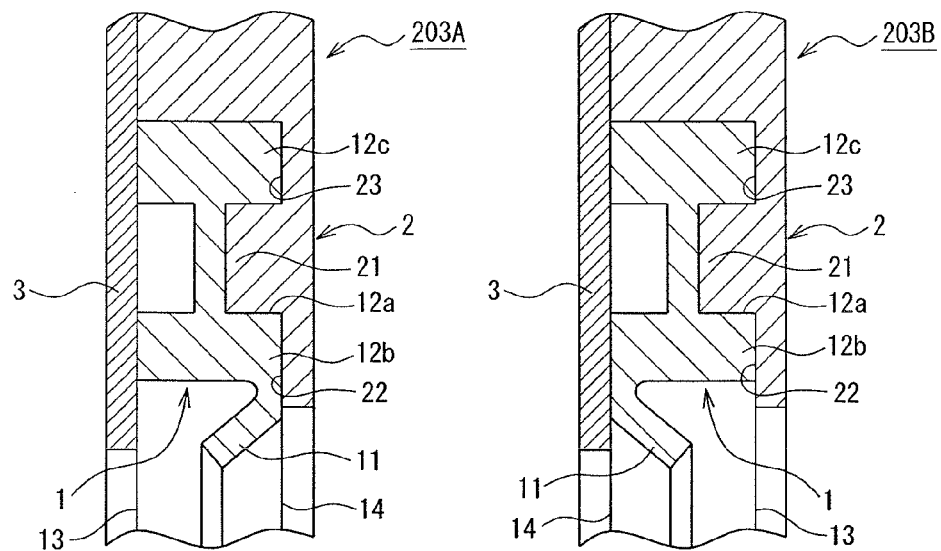
FIG. 7B
FIG. 8
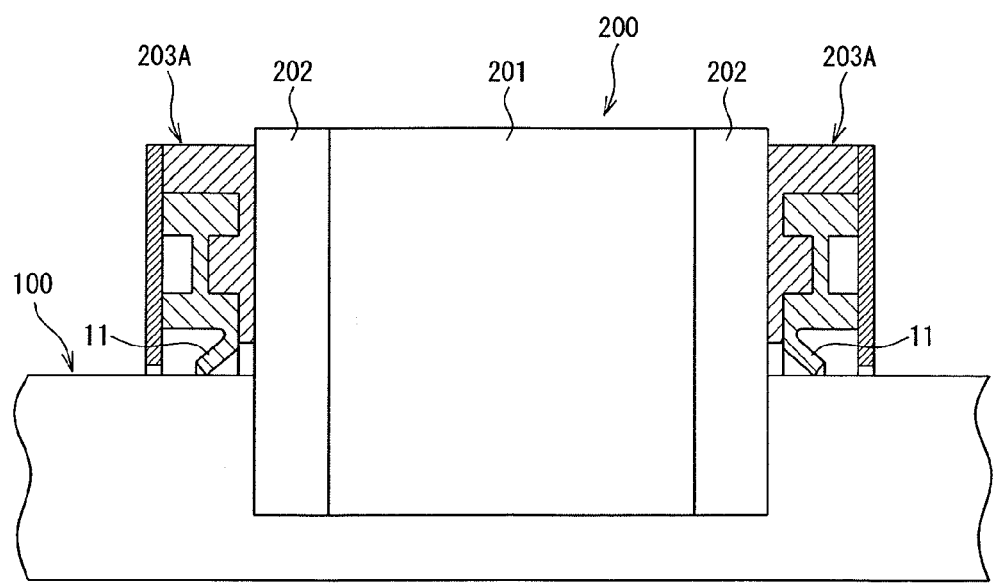

SIDE SEAL FOR LINEAR GUIDE APPARATUS, AND LINEAR GUIDE APPARATUS

TECHNICAL FIELD

The present invention relates to side seals attached to both ends in a direction in which a slider configuring a linear guide apparatus moves.

BACKGROUND ART

A conventional example of a linear guide apparatus is shown in FIG. 11. This linear guide apparatus includes a guide rail 100, a slider (also referred to as "bearing") 200, and a plurality of rollers (rolling elements) 300. The guide rail 100 and the slider 200 are disposed so as to face with each other to have therebetween rolling surfaces 110 and 210, respectively, which form a rolling channel for the rollers 300.

The slider 200 can be divided into a slider main body 201, end caps 202 attached to both ends of the slider main body, and side seals 203 further attached to both ends of the slider main body in the lengthwise direction of the guide rail 100. The rolling surfaces 210 are formed in the slider main body 201. The side seals 203 disposed at both ends in the linear-motion direction of the slider 102 have lips that seal spaces between the slider 200 and the top face of the guide rail 100 and between the slider and both side faces of the guide rail 100.

The slider 200 also has return channels 221 for the rollers 300 and turn-over channels 222 which cause respective return channels 221 and respective rolling channels to be communicated with each other. The return channels 221 are formed in the slider main body 201 and the turn-over channels 222 are formed in each end cap 202. Female screws 205 which enable attachment of a table, etc., by means of screws are formed on the top face of the slider 200.

Attachment holes for a grease nipple 400 are formed in the side seals 203 and the end caps 202. A lubricant is introduced to an oil path of the end cap 202 through the grease nipple 400, and thus the linear guide apparatus is lubricated. The side seals 203 and the end caps 202 are attached to the slider main body 201 by bolts 500. Attachment holes 120 for enabling attachment of the guide rail 100 to a mounting object like a base by means of bolts are formed in the guide rail 100.

According to this linear guide apparatus, a circulation channel for the rolling elements is formed by the rolling channel, the return channel, and the turn-over channel, and the rollers 300 circulate in the circulation channel, thereby allowing one of the guide rail 100 and the slider 200 to take a linear motion with respect to the other.

An example conventional side seal for such a linear guide apparatus has a metal plate and a base for a rubber-made seal member fixed on the metal holder plate, and brings the lip of the seal member into contact with the top face of the guide rail and both side faces thereof when in use.

Patent Document 1 discloses a technology that the holder plate (a casing) for the side seal and the seal member (a seal) with a lip (a sealing lip) are formed of different members, and a scraper is disposed so as to face the external face of the guide rail with a clearance from such an external face at the opposite side of the holder plate for the seal member. The holder plate and the seal are engaged with each other by fitting of a protrusion and a recess. According to such a side seal, relatively large foreign materials are repelled by the scraper at first, and thus the sealing lip can have a longer life and an improved action.

PRIOR ART DOCUMENT

Patent Document

Patent Document 1: JP 2007-211900 A

SUMMARY OF THE INVENTION

Problem to be Solved

The direction of the lip of the side seal is set in opposite ones depending on whether the dust-proof performance of the linear guide apparatus is important or the sealing performance of the linear guide apparatus is important. According to the side seal of Patent Document 1, the direction of the lip is unchangeable through the assembling, and thus it is necessary to prepare two kinds of holder plates and seal members to obtain side seals with lips in different directions. Conversely, if the direction of the lip of the side seal is changeable through the assembling, the costs inherent to the production of a mold for forming the seal member or the inventory of the seals can be reduced.

It is an object of the present invention to provide a side seal for a linear guide apparatus including: as structural components, a seal member; a holder plate to hold the seal member; and a cover (a scraper) disposed in front of the seal member, so as to be used as two kinds of side seals having a lip of a seal member in a different direction by simply preparing one kind of each structural component.

Solution to the Problem

To achieve the above object, according to a first aspect of the present invention, there is provided a side seal for a linear guide apparatus attached to each of both ends in a moving direction of a slider constituting a linear guide apparatus, the linear guide apparatus including a guide rail, the slider, and a plurality of rolling elements, and for sealing a space between the slider and a top face of the guide rail and between the slider and both side faces of the guide rail. The side seal includes a cover having an upper member facing the top face of the guide rail with a clearance and side members facing both side faces of the guide rail with a clearance. The side seal further includes a seal member disposed between the cover and the slider, and includes a lip in contact with the top face and both side faces of the guide rail, and a holder plate for holding a base of the seal member. The base of the seal member includes engaging portions which are symmetrical with respect to a center line of a thickness direction (the moving direction of the slider in an attached condition), engaged with the holder plate by fitting of a protrusion and a recess, and formed in both side faces of the seal member in the thickness direction. The lip of the seal member is inclined from one end side toward another end side in the thickness direction.

In the above-explained linear guide apparatus, the guide rail and the slider may be disposed so as to face with each other and may have therebetween rolling surfaces, respectively, which form a rolling channel for the rolling elements, and the rolling elements roll over such a rolling channel, thereby allowing either one of the guide rail and the slider to take a linear motion with respect to each other.

According to the side seal for the linear guide apparatus according to the above first aspect of the present invention, the direction of the lip of the seal member can be changed depending on which surface of both side faces of the base in the thickness direction can is used for fitting of the base of the seal member with the holder plate through a protrusion and a recess. Accordingly, it is possible to assemble two kinds of side seals having the lip of the seal member in a different direction.

Advantageous Effects of the Invention

According to the side seal for a linear guide apparatus of the present invention, the side seal can be used as two kinds of side seals having a lip of a seal member in a different direction by simply preparing one kind of each structural component.

BRIEF DESCRIPTION OF THE DRAWINGS

FIGS. 7A and 7B are cross-sectional views (corresponding to a cross-sectional view taken along a line C-C in FIG. 6) showing two ways of assembling the side seal of the embodiment;

FIG. 8 is a schematic structural diagram showing an example linear guide apparatus attached with the side seals of the embodiment;

DESCRIPTION OF EMBODIMENTS

An embodiment of the present invention will now be described with reference to the accompanying drawings.

Figure 1:
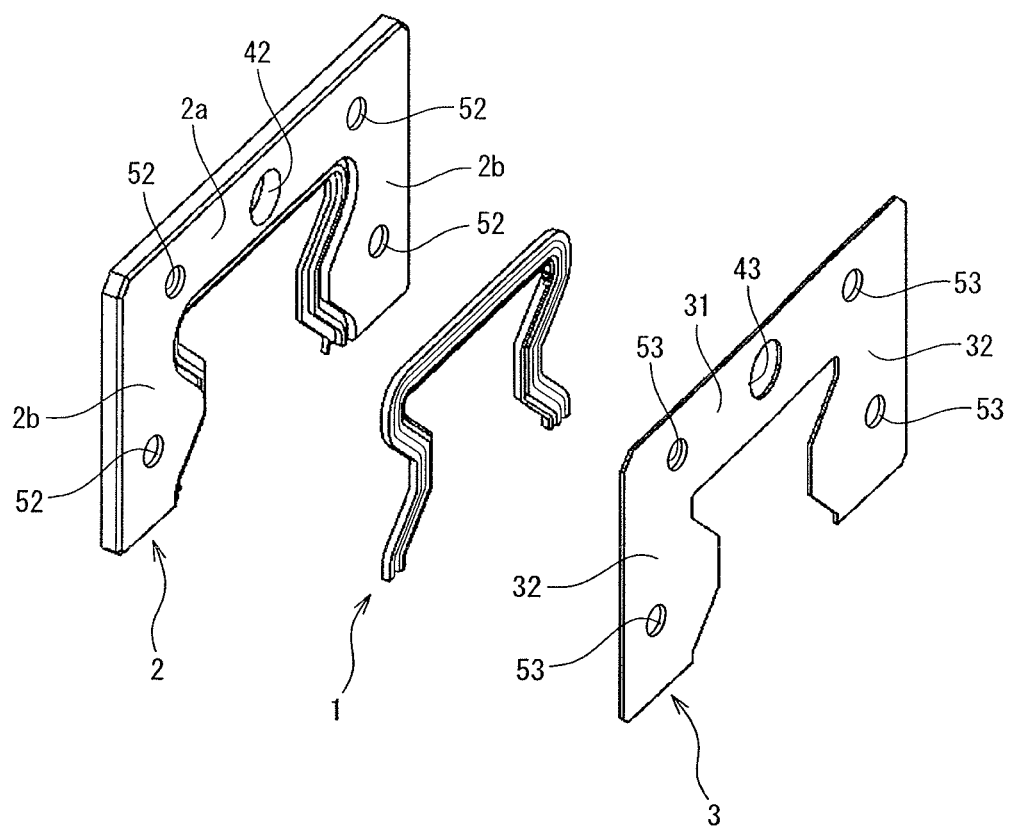
FIG. 1 is a perspective view showing a seal member, a holder plate, and a cover constituting a side seal according to an embodiment.
Figure 11:
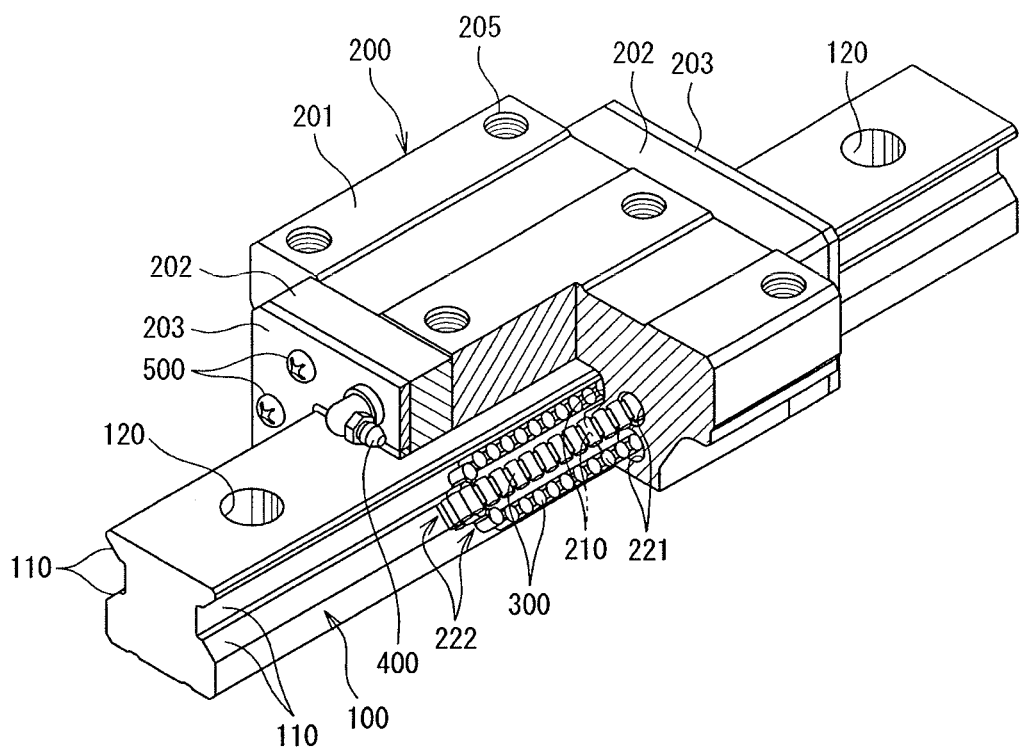
FIG. 11 is a partially sectional perspective view showing an example conventional linear guide apparatus.

A side seal according to the present embodiment can be used as a side seal 203 of the above-explained linear guide apparatus shown in FIG. 11, and includes, as shown in FIG. 1, a seal member 1, a holder plate 2, and a cover 3.

Figure 2:
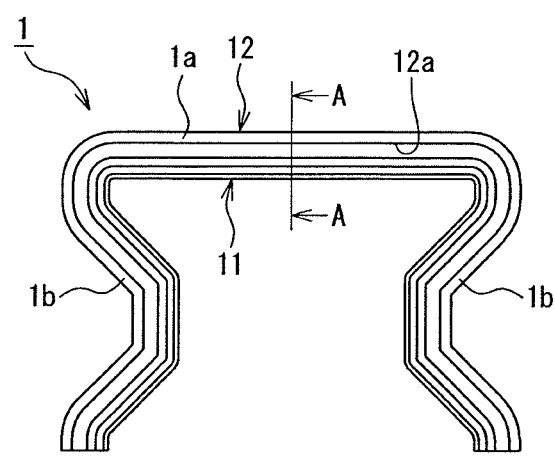
FIG. 2 is a front view showing the seal member constituting the side seal of the embodiment.
Figure 3:
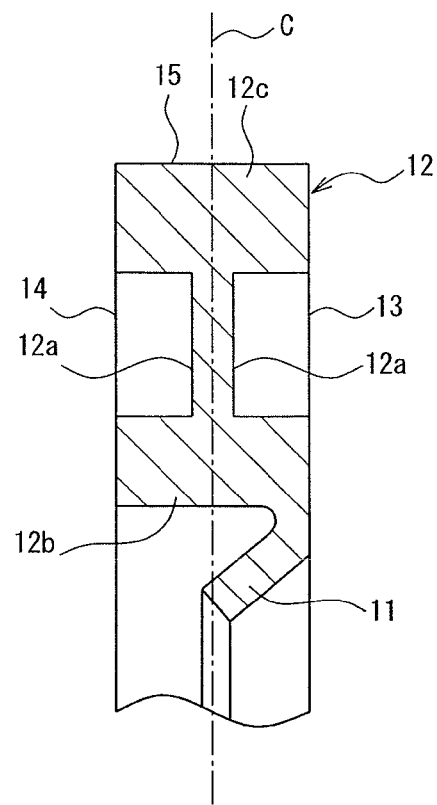
FIG. 3 is a cross-sectional view taken along a line A-A in FIG. 2.

As shown in FIG. 2, the seal member 1 can be divided into an upper seal portion 1a to be disposed above a guide rail 100 (see FIG. 11) and side seal portions 1b to be disposed at right and left sides of the guide rail 100, respectively, in an arrangement as viewed from the front. As shown in FIG. 2 and FIG. 3, the seal member 1 can also be divided into a lip 11 to be in contact with the top face of the guide rail and both side faces thereof, and a base 12 held by the holder plate 2 in a direction in which respective seal portions 1a and 1b face the guide rail.

The base 12 of the seal member 1 has, as shown in FIG. 3, recesses (engaging portions) 12a which are symmetrical relative to a center line C of a thickness direction (the moving direction of the slider in an attached state), engaged with the holder plate 2 by fitting of protrusions and recesses, and formed in both side faces 13 and 14, respectively, in the thickness direction. Such recesses 12a define the base 12 into a tip 12b and a base end 12c.

The lip 11 of the seal member 1 is formed at the tip 12b of the base 12, and is inclined from a first face 13 side toward a second face 14 side in the thickness direction of the base 12. A third face 15 that is the outermost (the distal side from the guide rail) face of the seal member 1 is orthogonal to the first and second faces 13 and 14 of the base end 12c.

Figure 4:
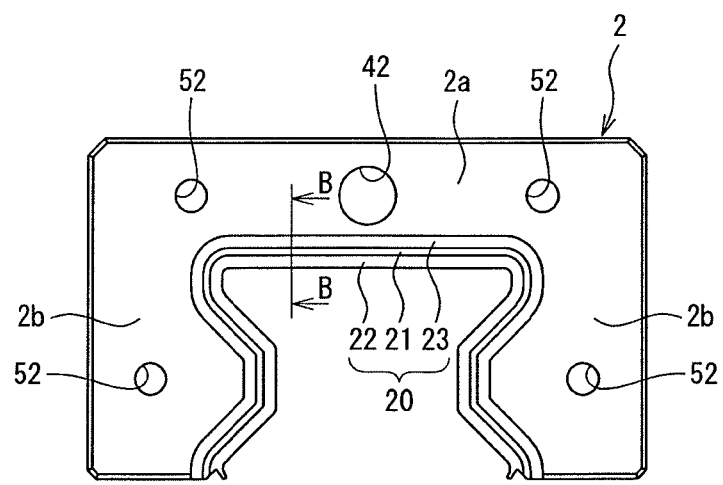
FIG. 4 is a front view showing the holder plate constituting the side seal of the embodiment.
Figure 5:
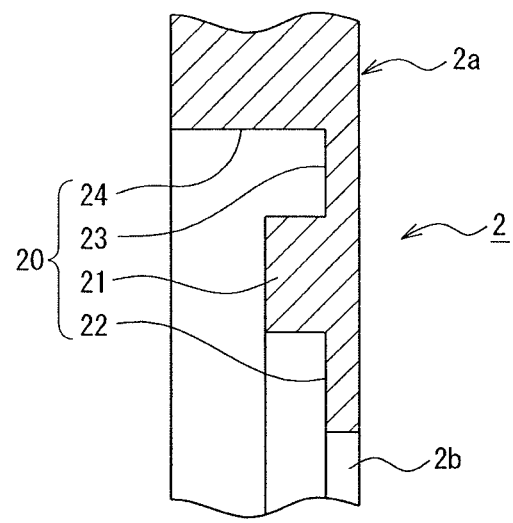
FIG. 5 is a cross-sectional view taken along a line B-B in FIG. 4.

As shown in FIG. 4 and FIG. 5, the holder plate 2 has a face in substantially same shape as that of the end cap 202 (see FIG. 11) constituting the slider 200 (see FIG. 11), and includes an upper portion 2a to be disposed above the guide rail 100 and side portions 2b to be disposed at right and left sides of the guide rail 100, respectively. Through holes 52 which allow respective bolts 500 (see FIG. 11) to pass through, and a through hole 42 for attaching a grease nipple 400 (see FIG. 11) are formed in the upper portion 2a. The through holes 52 which allow respective bolts 500 to pass through are also formed in respective side portions 2b. A holder portion 20 which holds the base 12 of the seal member 1 is formed in the internal side (the side toward the guide rail) of the holder plate 2.

The holder portion 20 includes a protrusion 21 to be fitted into the recess 12a of the base 12 of the seal member 1, a first holding face 22 formed inwardly of the protrusion 21, a second holding face 23 formed outwardly of the protrusion 21, and a third holding face 24 formed outwardly of the second holding face 23. The first holding face 22 and the second holding face 23 are parallel to the tabular face of the holder plate 2, and the third holding face 24 is orthogonal to the tabular face of the holder plate 2.

Figure 6:
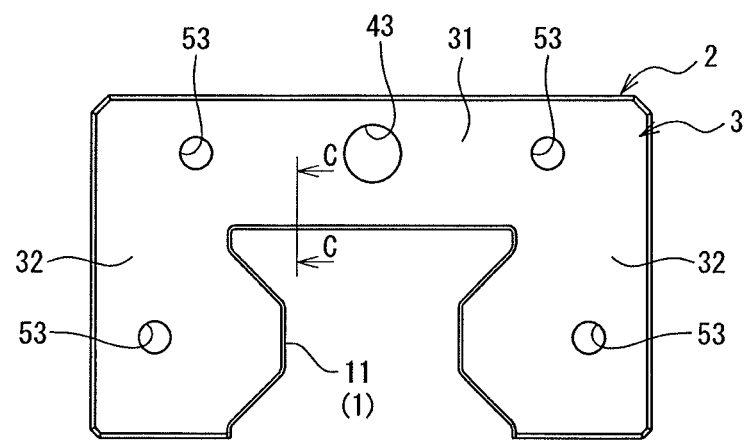
FIG. 6 is a front view showing the side seal as viewed from the cover side according to the embodiment.

As shown in FIG. 1 and FIG. 6, the cover 3 has a face in substantially same shape as that of the end cap 202 constituting the slider 200, and includes an upper member 31 facing the top face of the guide rail with a clearance therebetween and side members 32 facing right and left side faces of the guide rail 100, respectively, with a clearance therebetween. Through-holes 53 which allow respective bolts 500 to pass through, and a through hole 43 for attaching the grease nipple 400 are formed in the upper member 31. The through holes 53 which allow respective bolts 500 to pass through are also formed in respective side members 32.

The above-explained side seal has two ways of assembling as shown in FIGS. 7A and 7B.

With respect to the holder portion 20 of the holder plate 2, the base 12 of the seal member 1 is held by fitting the protrusion 21 into the recess 12a. At this time, the base end 12c is fitted into the recess formed by the third holding face 24, the second holding face 23, and the surface of the protrusion 21 facing the third holding face 24.

A side seal 203A shown in FIG. 7A is an example having the seal member 1 disposed with the first face 13 of the base 12 of the seal member 1 being directed to the protrusion-recess surface of the holder portion 20 of the holder plate 2. In this case, the first face 13 of the tip 12b of the base 12 comes into contact with the first holding face 22 of the holder portion 20, and the inclined tip of the lip 11 is directed toward the cover 3. Moreover, the first face 13 of the base end 12c of the base 12 comes into contact with the second holding face 23 of the holder portion 20.

A side seal 203B shown in FIG. 7B is an example having the seal member 1 disposed with the second face 14 of the base 12 of the seal member 1 being directed to the protrusion-recess surface of the holder portion 20 of the holder plate 2. In this case, the second face 14 of the tip 12b of the base 12 comes into contact with the first holding face 22 of the holder portion 20, and the inclined tip of the lip 11 is directed toward the holder plate 2. Moreover, the second face 14 of the base end 12c of the base 12 comes into contact with the second holding face 23 of the holder portion 20.

As explained above, according to the side seal according to the present embodiment, the side seal can be used as two kinds of side seals having the lip of the seal member 1 in different directions, by simply preparing one kind of seal member 1, holder plate 2, and cover 3.

When the dust-proof performance of the linear guide apparatus is regarded as particularly important, for example, as shown in FIG. 8, the side seals 203A assembled through the way shown in FIG. 7A are attached, and respective lips 11 are directed outwardly at both ends in the moving direction of the slider 200.

Figure 9:
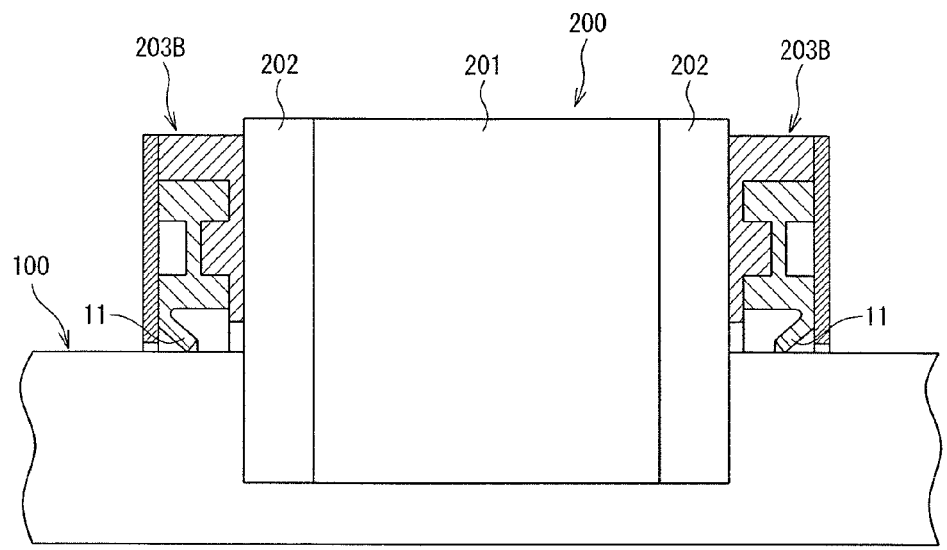
FIG. 9 is a schematic structural diagram showing an example linear guide apparatus attached with the side seals of the embodiment.

When the sealing performance of the linear guide apparatus is particularly important, for example, as shown in FIG. 9, the side seals 203B assembled through the way shown in FIG. 7B are attached, and respective lips 11 are directed inwardly at both ends in the moving direction of the slider 200.

Figure 10:
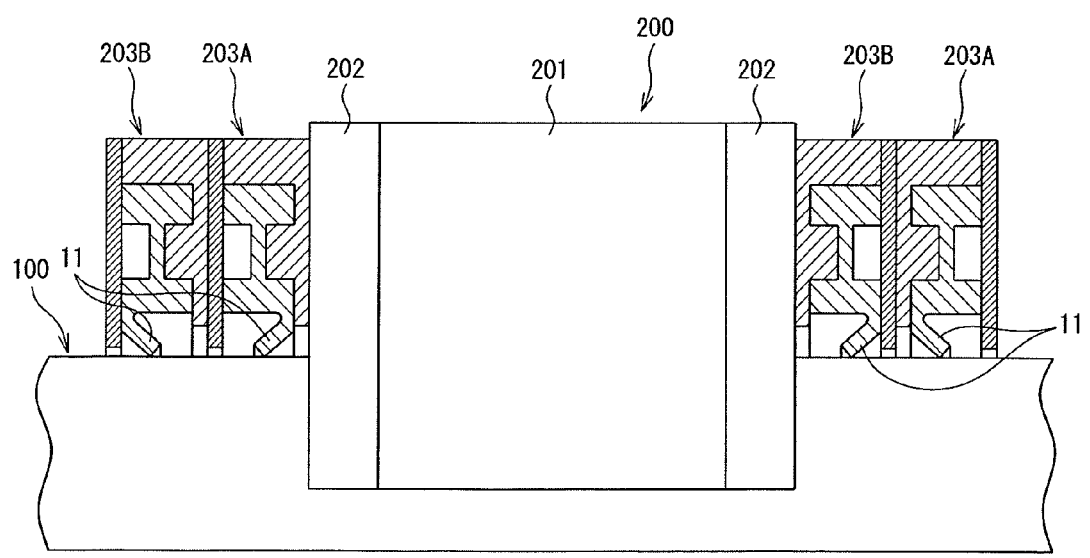
FIG. 10 is a schematic structural diagram showing an example linear guide apparatus attached with the side seals of the embodiment.

Moreover, as shown in FIG. 10, a combination of both kinds of side seals 203A assembled through the way shown in FIG. 7A and side seals 203B assembled through the way shown in FIG. 7B may be attached to each of both ends in the moving direction of the slider.

REFERENCE SIGNS LIST

1 Seal member
1a Upper seal portion
1b Side seal portion
11 Lip
12 Base
12a Recess of base (engaging portion)
12b Tip of base
12c Base end of base
13 First face of base
14 Second face of base
15 Third face of base
C Center line of thickness direction of base
2 Holder plate
2a Upper portion of holder plate
2b Side portion of holder plate
20 Holder portion
21 Protrusion
22 First holding face
23 Second holding face
24 Third holding face
3 Cover
31 Upper member of cover
32 Side member of cover
42 Through hole for attaching grease nipple
43 Through hole for attaching grease nipple
52 Through hole for allowing bolt to pass through
53 Through hole for allowing bolt to pass through
100 Guide rail
110 Rolling surface of guide rail
200 Slider
201 Slider main body
202 End cap
203 Side seal
205 Female screw
210 Rolling surface of slider
221 Return channel
222 Turn-over channel
300 Roller (rolling element)
400 Grease nipple
500 Bolt

The invention claimed is:

1. A side seal for a linear guide apparatus attached to each of both ends in a moving direction of a slider constituting a linear guide apparatus, the linear guide apparatus comprising a guide rail, the slider, and a plurality of rolling elements, for sealing a space between the slider and a top face of the guide rail and between the slider and both side faces of the guide rail, the side seal comprising:

a cover comprising an upper member facing the top face of the guide rail with a clearance, and side members facing both side faces of the guide rail with a clearance;

two seal members disposed between the cover and the slider, and each of the two seal members comprising a lip in contact with the top face and both side faces of the guide rail and a base, a base end of which has a first face and a second face; and two holder plates, each of the two holder plates holding a respective base of a respective one of the two seal members, wherein engaging portions are formed on both faces of the base of each of the two seal members in a thickness direction, the engaging portions being symmetrical with respect to a center line of the thickness direction, and wherein the lip of each of the two seal members is inclined from the first face toward the second face, and wherein a holder portion formed in an internal side of each of the two holder plates has a protrusion to be fitted into one of the engaging portions of a respective one of the two seal members, a first holding face formed inwardly of the protrusion, a second holding face formed outwardly of the protrusion, and a third holding face formed outwardly of the second holding face, and wherein the two seal members are a first seal member and a second seal member, and wherein the first face of the base end of the base of the first seal member comes into contact with the second holding face of the holder portion of a first one of the two holder plates to engage the engaging portion formed on the first face of the base end of the base of the first seal member with the first one of the two holder plates, and wherein the second face of the base end of the base of the second seal member comes into contact with the second holding face of the holder portion of a second one of the two holder plates to engage the engaging portion formed on the second face of the base end of the base of the second seal member with the second one of the two holder plates, and wherein the first seal member and the second seal member are assembled in combination.

2. The side seal for the linear guide apparatus according to claim 1, wherein the first holding face and the second holding face of the holder portion are parallel to a respective tabular face of each of the two holder plates, and the third holding face is orthogonal to the respective tabular face of each of the two holder plates.

3. The side seal for the linear guide apparatus according to claim 2, wherein the first face of the first seal member comes into contact with the first holding face of the holder portion of the first one of the two holder plates, and an inclined tip of the lip of the first seal member is directed toward the cover.

4. The side seal for the linear guide apparatus according to claim 2, wherein the second face of the second seal member comes into contact with the first holding face of the holder portion of the second one of the two holder plates, and an inclined tip of the lip of the second seal member is directed toward the second one of the two holder plates.

5. The side seal for the linear guide apparatus according to claim 1, wherein the first face of the first seal member comes into contact with the first holding face of the holder portion of the first one of the two holder plates, and an inclined tip of the lip of the first seal member is directed toward the cover.

6. The side seal for the linear guide apparatus according to claim 1, wherein the second face of the second seal member comes into contact with the first holding face of the holder portion of the second one of the two holder plates, and an inclined tip of the lip of the second seal member is directed toward the second one of the two holder plates.

7. A linear guide apparatus, wherein the side seal according to claim 1 is assembled such that the lip of the first seal member is directed outwardly at both ends in the moving direction of the slider.

8. A linear guide apparatus, wherein the side seal according to claim 1 is assembled such that lip of the second seal member is directed inwardly in the moving direction of the slider.

9. A linear guide apparatus comprising side seals according to claim 1 attached to both ends, respectively, in the moving direction of the slider.

* * * * *